H. OERTLI.
KNIFE.
APPLICATION FILED OCT. 10, 1916.
1,346,669.
Patented July 13, 1920.
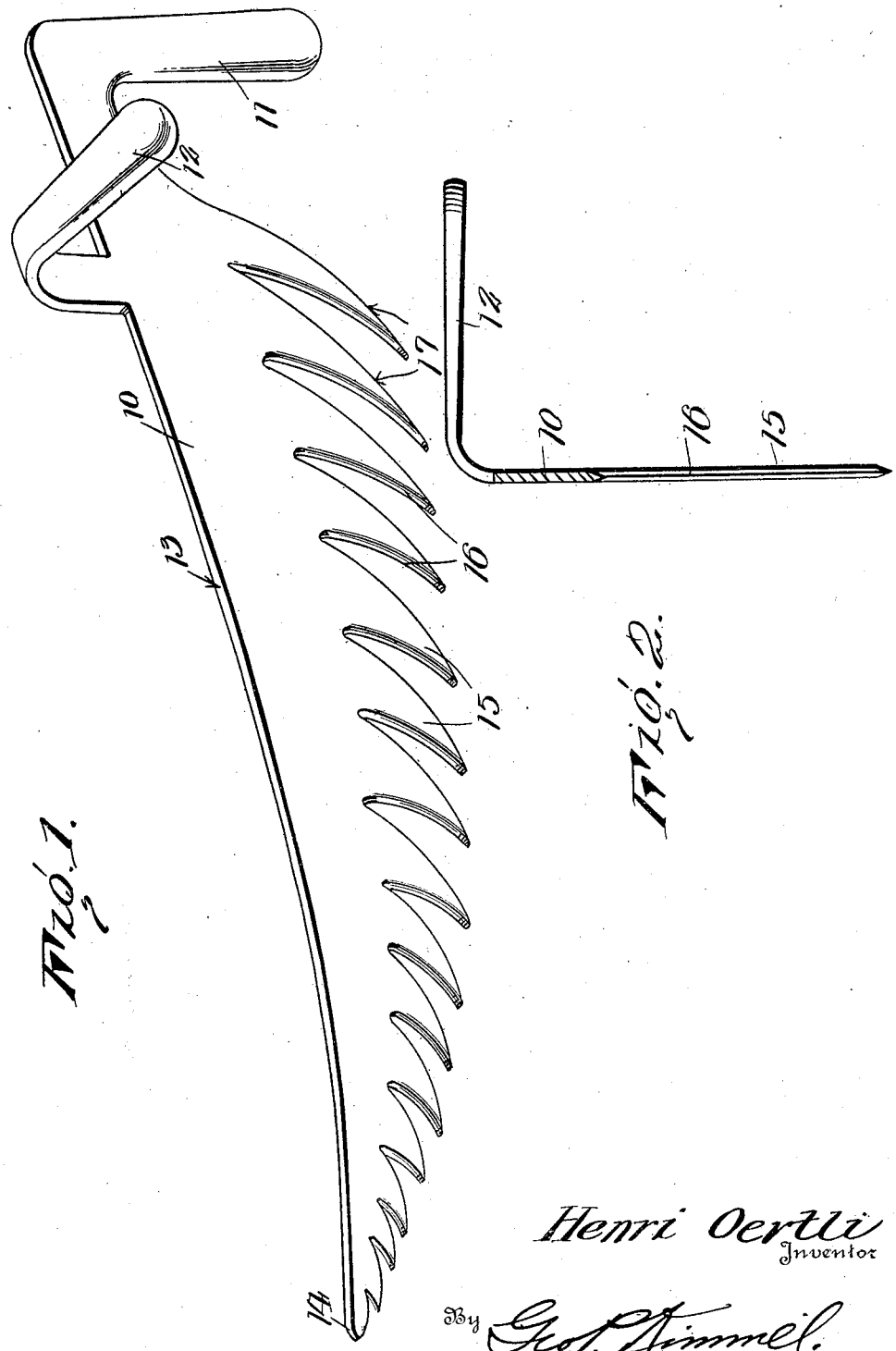
Henri Oertli
Inventor
By Geo. I. Kimmel.
Attorney

UNITED STATES PATENT OFFICE.

HENRI OERTLI, OF DALE, TEXAS.

KNIFE.

1,346,669.　　　　Specification of Letters Patent.　　Patented July 13, 1920.

Application filed October 10, 1916. Serial No. 124,853.

*To all whom it may concern:*

Be it known that I, HENRI OERTLI, a citizen of the United States, and resident of Dale, in the county of Caldwell and State of Texas, have invented certain new and useful Improvements in Knives, of which the following is a specification.

The present invention relates to cutlery and has particular reference to new and useful improvements in food cutting knives and the like, the invention having as its primary object the provision of a knife having a novel cutting edge provided with a plurality of blades curved in a common direction to facilitate cutting.

Another object of my invention is to provide a device of the class described which may be cheaply manufactured and sold, is strong and durable and will perform the severing operation more rapidly than the knives now in use.

A further object of my invention is to provide a knife of the class described having a novel arrangement of cutting blades associated therewith whereby when using the knife a draw-cut is afforded, which it will be readily understood is more efficient than a straight cut.

Other objects and advantages to be derived from the use of my improved knife will appear from the following detailed description and the claim, taken with an inspection of the accompanying drawing, in which:

Figure 1 is a perspective view of a knife having a blade embodying the improvements of my invention; and Fig. 2 is transverse sectional view through a portion of the blade.

Referring more particularly to the drawing, wherein similar characters of reference designate like and corresponding parts throughout the various views, 10 designates the main body of a knife, the same being formed with a main handle 11 on one end thereof, said handle being integrally connected with the body of the knife. A second handle 12 is provided extending laterally from the body 10 and at right-angles to the handle 11, said handle 12 being disposed above the upper curved marginal edge 13 of the body 10.

The body 10 is preferably of a tapering configuration, the outer free end thereof terminating in a point 14. The cutting means embodies a plurality of curved cutting elements 15 formed from the body 10 and provided with front and rear cutting edges 16 and 17, respectively. The blades reduce in size toward the front end of the body.

In use the knife is reciprocated much in the same manner as that of the usual knife, the cutting edges 16 acting upon an object on the forward stroke, and the cutting edges 17 in turn acting upon an object on the rearward stroke, thereby obtaining a draw-cut in both directions.

I desire to lay particular stress upon the extreme simplicity of my improved knife, the same being struck from a single sheet of metal, which not only provides an efficient cutting device but also tends to cheapen the manufacture of the same.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

An improved food knife comprising a tapering blade-like body having a concaved upper edge and a convex lower edge, said upper edge at its widest portion being formed with an integral extension bent downwardly and laterally at right angles and having a reduced portion with a depending handle in alinement with the body, the convex edge of the body being provided with spaced teeth formed with concaved forward edges and convexed rear edges with corresponding intervening V-shaped notches having corresponding curved side portions, said teeth being pointed and graduating in length from the wider to the narrower portion thereof, the teeth at the wider portion adjacent to the laterally extending handle being longer than those at the tapered end and conforming at the said wide end to the rear extension of the body, said teeth providing cutting action in opposite directions.

In testimony whereof I affix my signature hereto.

HENRI OERTLI.